(12) United States Patent
Schindler (10) Patent No.: US 8,929,909 B2
(45) Date of Patent: Jan. 6, 2015

(54) HANDOVER PROACTIVE ASSOCIATION CLEARING SUPPORT METHOD AND SYSTEM

(75) Inventor: Sigram Schindler, Berlin (DE)

(73) Assignee: Sigram Schindler Beteiligungsgesellschaft mbH, Berlin (DE)

( * ) Notice: Subject to any disclaimer, the term of this patent is extended or adjusted under 35 U.S.C. 154(b) by 132 days.

(21) Appl. No.: 13/485,646

(22) Filed: May 31, 2012

(65) Prior Publication Data

US 2012/0309449 A1    Dec. 6, 2012

Related U.S. Application Data

(60) Continuation-in-part of application No. 13/177,346, filed on Jul. 6, 2011, now Pat. No. 8,351,395, which is a division of application No. 11/969,388, filed on Jan. 4, 2008, now Pat. No. 8,014,364.

(60) Provisional application No. 61/491,356, filed on May 31, 2011.

(51) Int. Cl.
*H04W 36/00*  (2009.01)
(52) U.S. Cl.
USPC ........................... 455/453; 455/525; 455/436
(58) Field of Classification Search
USPC .................................................. 455/436–444
See application file for complete search history.

(56) References Cited

U.S. PATENT DOCUMENTS

| 6,714,784 | B1 * | 3/2004 | Forssell et al. ................. 455/436 |
| 8,014,364 | B2 | 9/2011 | Schindler et al. |
| 2005/0288023 | A1 | 12/2005 | Kim et al. |
| 2009/0274115 | A1 | 11/2009 | Schindler et al. |
| 2010/0085942 | A1 | 4/2010 | Oota et al. |
| 2011/0286431 | A1 | 11/2011 | Schindler et al. |

FOREIGN PATENT DOCUMENTS

| EP | 1458148 A1 | 9/2004 |
| EP | 1560445 A2 | 8/2005 |
| EP | 2 027 747 B1 | 6/2011 |
| WO | 2005/120183 A2 | 12/2005 |

OTHER PUBLICATIONS

Written Opinion of the International Searching Authority—PCT/EP2012/073722.

* cited by examiner

*Primary Examiner* — Kashif Siddiqui
(74) *Attorney, Agent, or Firm* — Vorys, Sater, Seymour and Pease LLP; Vincent M. DeLuca (57) ABSTRACT

A handover proactive association clearing support method and system supports minimizing handover times for at least one netsurfing end system, and optimizing a given market satisfaction function (MSF0) potentially depending on Internet-applications for whichever underlying HO technique, by potentially establishing pre-HO for free x/yz-, netsurfing x/yz-, and/or Sxyzj-association, called "clearing" them. An HO of an Ayz is optimal if its HO-time is "basically zero" and it complies with MSF0. The technical innovation of the method and system comprises for an Ayz determining any time its optimal HOs. This permanent predetermination of optimal HOs implies assessing permanently all parameters. Thus, when an Ayz must perform an HO, these pre-HO operations of the method/system would have already identified at least one optimal HO for it to a sharedIADx and/or an Sxyzj available to it and established the resp. x/yz-, netsurfing x/yz-, and Sxyzj-associations.

10 Claims, 6 Drawing Sheets

HANDOVER PROACTIVE ASSOCIATION CLEARING SUPPORT METHOD AND SYSTEM

BACKGROUND AND SUMMARY OF THE INVENTION

A. The Problem Solved by the HOPA-ClearS Method/Apparatus

The Handover (HO) Proactive Association Clearing Support (HOPA-ClearS) method/system supports
minimizing, for at least one netsurfing endsystem Ayz (see EP 2027747, "HOBIS") its HO times, and
optimizing a given market satisfaction function, MSF0, potentially depending on Internet-apps,
for whichever underlying HO technique, by potentially establishing pre-HO for free x/yz-, netsurfing x/yz-, and/or Sxyzj-association (plural "s" often omitted), called "clearing" them. It may use, as parameters, a HOPA-ProvS data structure (see U.S. 61/490,469, "HOPA-ProvS")—potentially making it "quality guaranteeing", anyway "residual best effort" based, otherwise being "just best effort"—and Internet application service Sxyzj, abbreviated Sj, provided to Ayz or its user, and additional market satisfaction function MSFxyzjm, abbreviated MSFm, x, y, z, j, m=1, 2, 3, ...

An HO of an Ayz is optimal if its HO-time is "basically zero" and it complies with MSF0, potentially also taking the HOPA-ProvS data structure into account. Then the technical innovation of the HOPA-ClearS method/system may be put as follows: It comprises for an Ayz determining anytime—hence pre-HO—its optimal HOs, potentially limited to optimality over the HOPA-ProvS data structure.

I.e.: This permanent predetermination of optimal HOs implies—due to dynamically changing services available to or requested from the Ayz—assessing permanently all MSFm (being uniformly/Ayz-specifically/Ayz-group-specifically given e.g. by the managements of the Ayz, such as: always or at certain occasions select the cheapest service or the best service or provided by a certain implementation or . . . ) subject to a given global market satisfaction function MSF0 assessing some given global qualities of the clearing processes (such as: no Ayz must starve, no sharedIADx is overbooked, no cost unnecessarily incurred, one Ayz gets always best quality, . . . ,) and establishing the resp. x/yz-, netsurfing x/yz-, and Sxyzj-associations. Thus, when an Ayz must perform an HO, these pre-HO operations—using Ayz'es home-IADz/Internet and/or the sharedIADx'es WLAN and/or still another network than these two—of the HOPA-ClearS method/system would have already identified at least one optimal HO for it to a sharedIADx and/or an Sxyzj available to it and established the resp. x/yz-, netsurfing x/yz-, and Sxyzj-associations.

Hence, by its innovative pre-HO operations, the HOPA-ClearS method/system resolves the problem to manage the communications between the elements of its parameters, such that always holds:
the HO-times of Ayz to sharedIADx/Sj are reduced to basically zero, and
the market satisfaction functions MSFm and MSF0 are maintained and in this sense optimal, and
instant, seamless, and individually/groupwise targeted changes of its parameters and/or its implementation versions are enabled, as required e.g. for meeting dynamically changing requirements of Ayz users.

That, as seen post-HO, most such pre-HO activities of the HOPA-ClearS method/system have been useless, is economically often by far overcompensated by its just outlined advantages.

The HOPA-ClearS method/system works on top of all today's networks between/within which HOs are to be executed—though it may be integrated into networks and/or their HO mechanisms, as well—yet requires sufficiently powerful netsurfing Ayz and IADs and for efficiency Internet-apps' implementations supporting it.

B. The Novelty and the Nonobviousness of the HOPA-ClearS Method/System

The novelty of the HOBIS invention has just been established by the HOBIS patent. As the HOPA-ClearS method/apparatus builds on top of the HOBIS invention, there is absolutely no prior art for it—so far no inventor has ever thought into this direction and disclosed a technique teaching enabling resolving the above quoted problem. This makes not only its novelty self-explanatory, but also its nonobviousness.

DETAILED DESCRIPTION OF THE INVENTION

C. Description of the HOPA-ClearS Method/System and its Embodiments

Due to the novelty of the netsurfing and MHO methods of the HOBIS patent—which are particularly important for the HOPA-ClearS method/system and for which it is particularly important—their fundamental features are outlined, first. This simplifies the subsequent description of the HOPA-ClearS method/system.

A remark up front: This HOPA-ClearS patent application comprises no limitation of the functionalities of pre-HO clearing strategies of x/y- and alike-associations" (see Section D)—thus the HOPA-ClearS method/system is inherent in all HO proactive association clearing strategies.

Let's start with a netsurfing system A0 with homeIAD0 and with an MHO of A0 to a sharedIADx, as known from the HOBIS patent. The HOPA-ClearS method/apparatus deals with non-managed HOs—and in particular with "service-HOs" (see Section D), managed or not—the same way as explained now by means of MHOs.

Each MHO of a netsurfing system A0 is supported by its homeIAD0 (see the HOBIS patent). Any OSI-connection of A0 is relayed via the MHO-module MHO-M, which is controlled by an MHO-specification MHO-S in the homeIAD0 or even executed there. The MHO-S may be homeIAD0-management-private, A0-type-specific or even A0-individual. The HOPA-ClearS-S/-M are peer to the MHO-S/-M, but functionally quite different.

Figure 1:
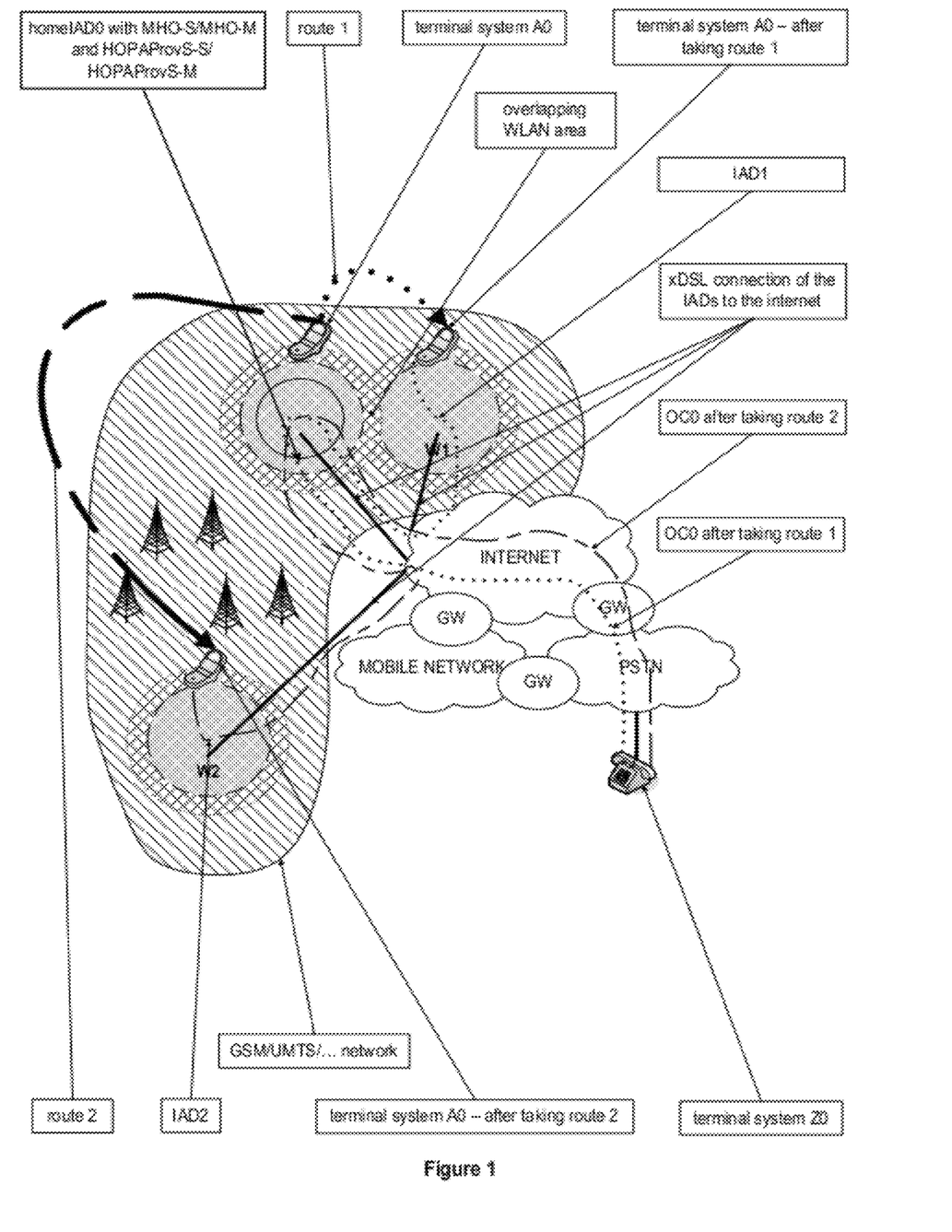
FIG. 1 is a block diagram of a netsurfing configuration applicable to the present invention.

FIG. 1 shows the simplest netsurfing configurations. MHO-S/-M and HOPA-ClearS-S/-M are assumed to be integrated into the homeIAD0 (FIGS. 6-8 in the HOBIS patent show their distributed implementations and hence there is no need to recapitulate this here). It illustrates an MHO of the netsurfing A0 (e.g. of a smartphone with a user and an existing OSI-connection, OC0, see chapter D.) from its homeW-LAN0, for short: W0 (of the homeIAD0), into W1, which is non-disjoint to it, respectively into W2, which is disjoint to it, along route 1 or 2 respectively. The existing OC0 between A0 and Z0 is not touched by these MHOs along the routes 1 resp. 2. However, after A0 has completed its HO into W1 or W2, one L3-connection/association in this OC0 is relayed from the IAD1 resp. IAD2 (here: sharedIAD1 resp. sharedIAD2) over the A0-MHO-M in the homeIAD0. Technical details and variants (e.g. "tunneling"/"multiplexing"/"compressing") are known from mobile Internet technique.

As to a small and a large home/sharedIAD resp. its home/shared (W)LAN, the same holds as what is said in the HOBIS patent: Its LAN/WLAN is considered as Internet access LAN/WLAN (alias IAW), and may comprise, for this invention, one or more cells and hence IADs of any wireless technology, e.g. of RFI/WiFi/Blue Tooth/Femtocell/DECT/Wimax/GSM/CDMA/UMTS/GPRS/HSPDA/LTE/ . . . technologies. But, this IAW must be managed (by some "overlay network functionality") such that it functionally is a single endsystem representing a single home/sharedIAD, as managed in this invention. Then seamlessly roaming between its cells is possible, in particular without interruption of any of its existing OSI-connections, OCs. Thus, an IAW may be distributed regionally and e.g. comprise IADs and/or such BS's (BS=Base Station of a mobile network) connected via fixed-line PSNs (=Packet Switching Networks), extend only to parts of their regions of technical accessibility, and geographically comprise separate areas even with holes therein. The HOPA-ClearS method/apparatus is applicable for HOs between all such "network configurations", i.e. between IAW cells as well as between IAWs.

As stated above, the HOPA-ClearS method/system achieves its innovations by acting at points in time, namely pre-HO—which is neither considered by the prior art in HO technology nor by the HOBIS patent. These pre-HO operations of the HOPA-ClearS method/system perform (for a set of sharedIADx, a set of netsurfing mobile terminal systems Ayz with homeIADz, a set of services Sj, and a set of HOPA clearing systems CSm, x, y, z, j, m=0, 1, 2, 3, . . . ) all clearings of x/yz- and alike-associations. I.e.: As a service Sj shall instantly be available to Ayz right at its HOing to the sharedIADx/Sxyzj, these pre-HO operations of the HOPA-ClearS method/system proactively establishes already all possible x/yz-associations providing consolidated Sj—i.e. which potentially are required for providing Sj to the user of Ayz post-HO—at least basically (see the next paragraph and Section D).

I.o.w.: The preceding paragraph shows that and how the HOPA-ClearS method/system
achieves the optimization of its market satisfaction functions
  alias its set of CSm: It namely identifies all the consolidated Sj which are available post-HO for optimization of the global market satisfaction function. The person of pertinent skill knows that thereby a "HOPA-ProvS data structure" is needed (see Section D)—which here is assumed to be given—providing the basis for any optimization of this consolidation—for avoiding post-HO conflicts of SLAs and/or resources availability.
actually may marginalize HO-times encountered by the Ayz user (and would be caused if the Ayz had to reconnect, after the HO, to the service(s) of Sxyzjkm used prior to the HO, unless the pre- and post-HO networks cooperated in handing it over between them, what is not assumed in this patent application and thus implies that an Sxyzjkm-association must be established after the HO, again), why the HOPA-ClearS method/system establishes it proactively pre-HO. Thereby the HOBIS method/system guarantees that the x/yz-association(s) are established completely, while it may be impossible to instantly complete the establishment of an x/u-association (which need not exist, at all), e.g. pre-HO—due to the design or implementation of a communications application underlying it. This then is called a "basic establishment" of the communications connection, and the implied resp. HO-time then is reduced to "basically zero".

Consolidation by CS0

The practical implementation of the HOPA-ClearS system—wherein the implementation of the HOPA-ClearS-S controls the implementation of the HOPA-ClearS-M—always consists of physical HW and SW components, just like all working computers. Therefore, these HW components need not be used exclusively by its HOPA-ClearS-SW components, but may be used also by any other system's SW components. Thereby the implementation of the HOPA-ClearS data structure and its managing system(s) may be distributed, e.g. onto the respective homeIADz or sharedI-ADx, or centralized on some server, or a mixture of both. In addition, system design knows techniques enabling efficient and integrity preserving concurrent accesses to this data structure for updating/changing it flexibly and instantly by appropriately synchronizing all read and write accesses to it. Thus, the person of pertinent ordinary skill knows a plurality of embodiments of the HOPA-ClearS method/system.

The HOPA-ClearS method/system (for a netsurfing Ayz, its homeIADz and a sharedIADx) is subject to the fundamental restriction that Ayz may use the sharedIADx solely as a router solely to the Ayz-homeIADz resp. its Ayz-MHO_S with a fixed IP address—except for the services of communications applications privately provided by the sharedIADx. Both, the correctness of the IP address as well as the compatibility of such private services with the implementation of the HOPA-ClearS (and HOBIS, . . . ) method/system, need to be explicitly approved by the managements of the sharedIADx prior to completing the HO of Ayz to it resp. of the Ayz-homeIADz or the Ayz. I.e., Ayz may use this sharedIADx also for using other services than those provided via the netsurfing x/yz-association, namely provided privately by the sharedIADx and bypassing the Ayz-homeIADz. The sharedIADx thus guarantees in real-time that its management can always identify, as to communications relayed over it and even prior to starting its application system, the managements of an Ayz and a PSxyzjkm being responsible for it (e.g. by their approvals).

Figure 2A:
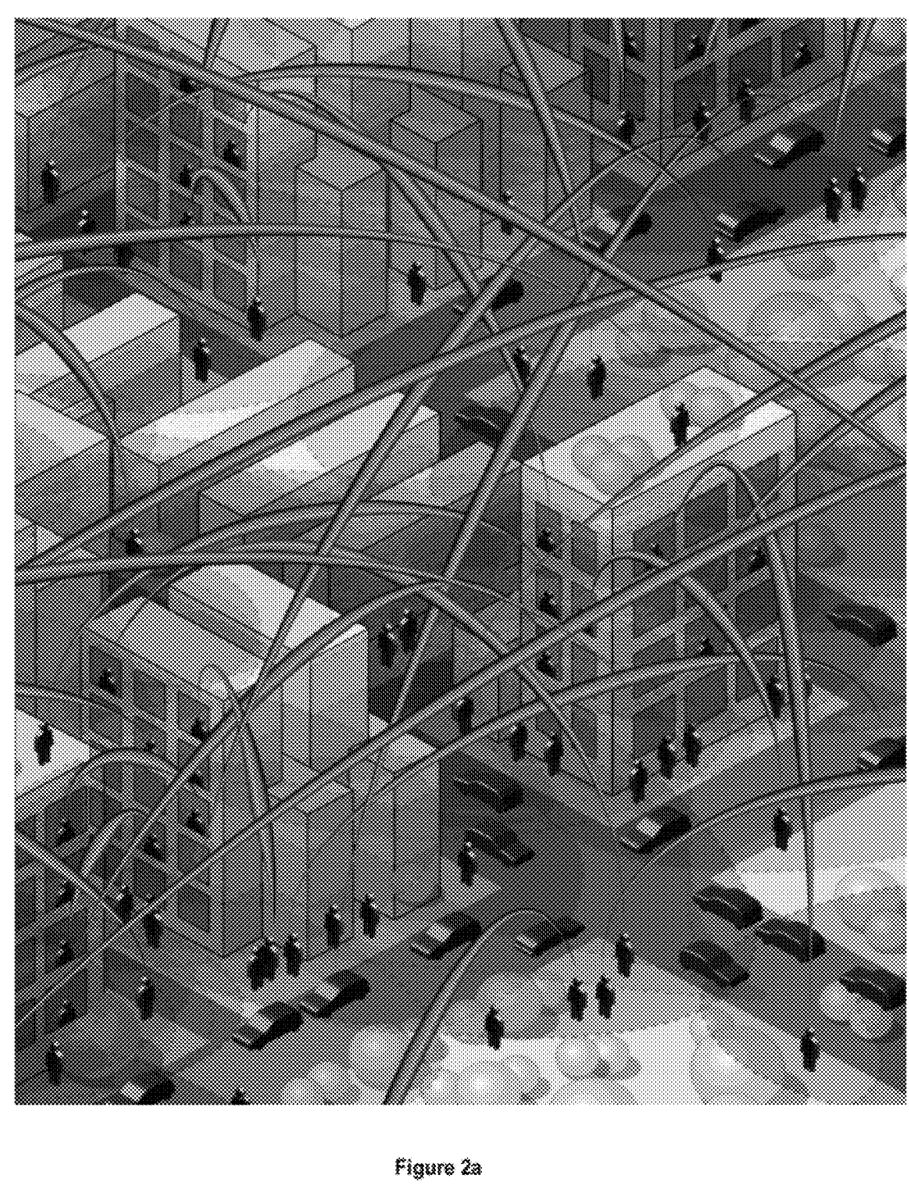
FIGS. 2a and 2b are respective schematic and block diagrams of a business district having overlapping wireless network cells.
Figure 2B:
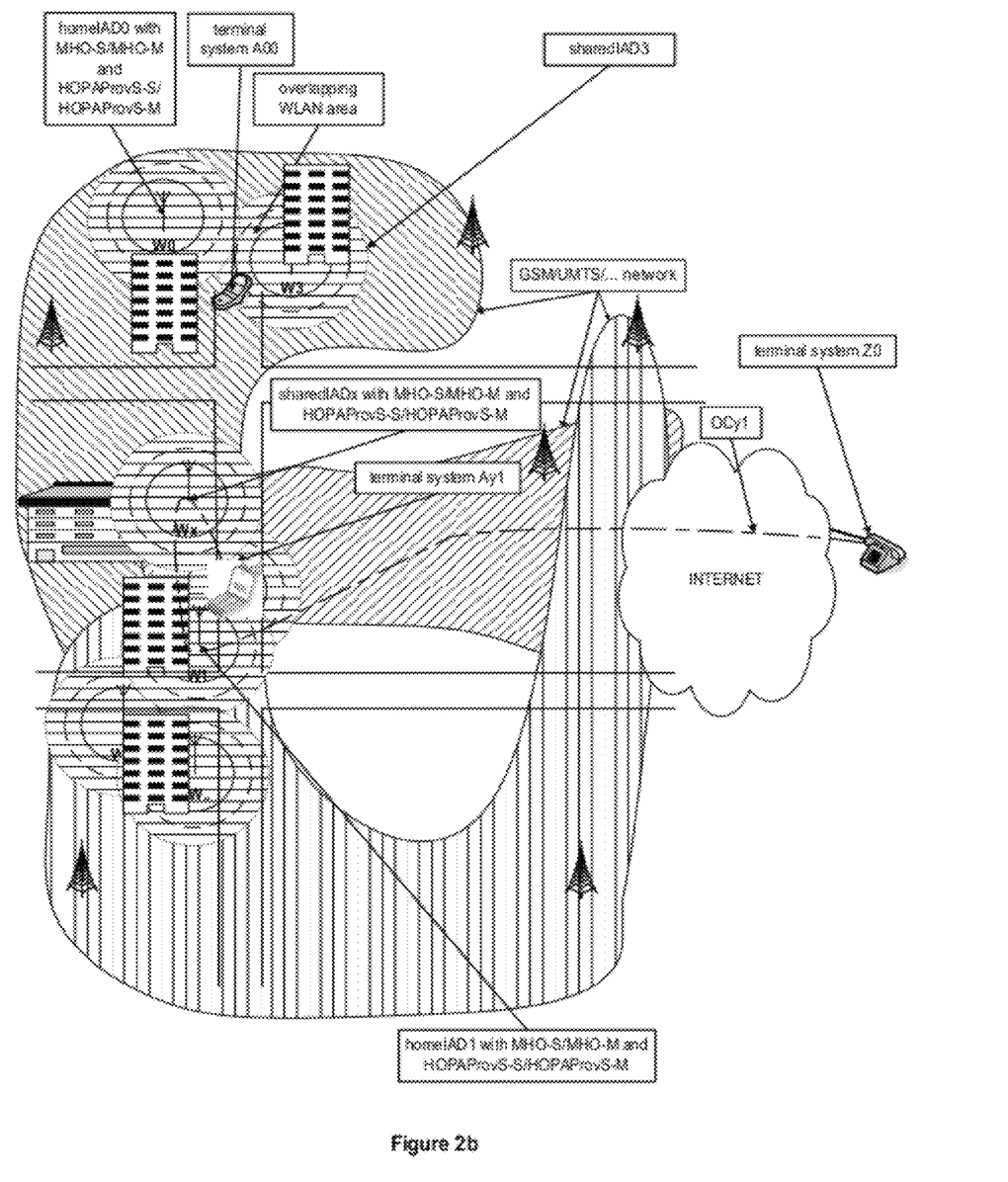

FIG. 2a schematically shows a business district, in any building of which there are several sharedIADx cells, overlapping and independent of each other (e.g. WiFi based, as zoomed-in by FIG. 2b), which on their turn overlap with several GSM networks—wherein the respective areas of accessibility of the sharedIADx'es are indicated by "dashed" boundary lines. In addition, there insofar two different kinds of smartphone systems Ayz are schematically shown (visualized by their two different shapes), as they belong to two different homeIADz and its Ayz-MHO_S. If a mobile Ayz moves, e.g. along the street in FIG. 2a, then permanently new potential and/or actual HO requirements arise for Ayz as to a series of sharedIADx'es along its way. The appropriateness check of a potential HO as to its optimality by a HOPA clearing system (see the HOPA-ClearS method/system above) and its actual execution are accelerated by the HO-proactive HOPA-ClearS method/system.

Something can change in this context even without Ayz not moving, stimulating the question whether its HO were appropriate—due e.g. to either an SLA unacceptable decrease of the quality/cost ratio of the L3-service provided to Ayz by its currently used sharedIADx, or to an increase of the L3-service quality needed by Ayz because of its user's start of another broadband streaming application, or to the HOPA clearing system's cooperation with another system (e.g. a HOPA clearing system).

Figure 3A:
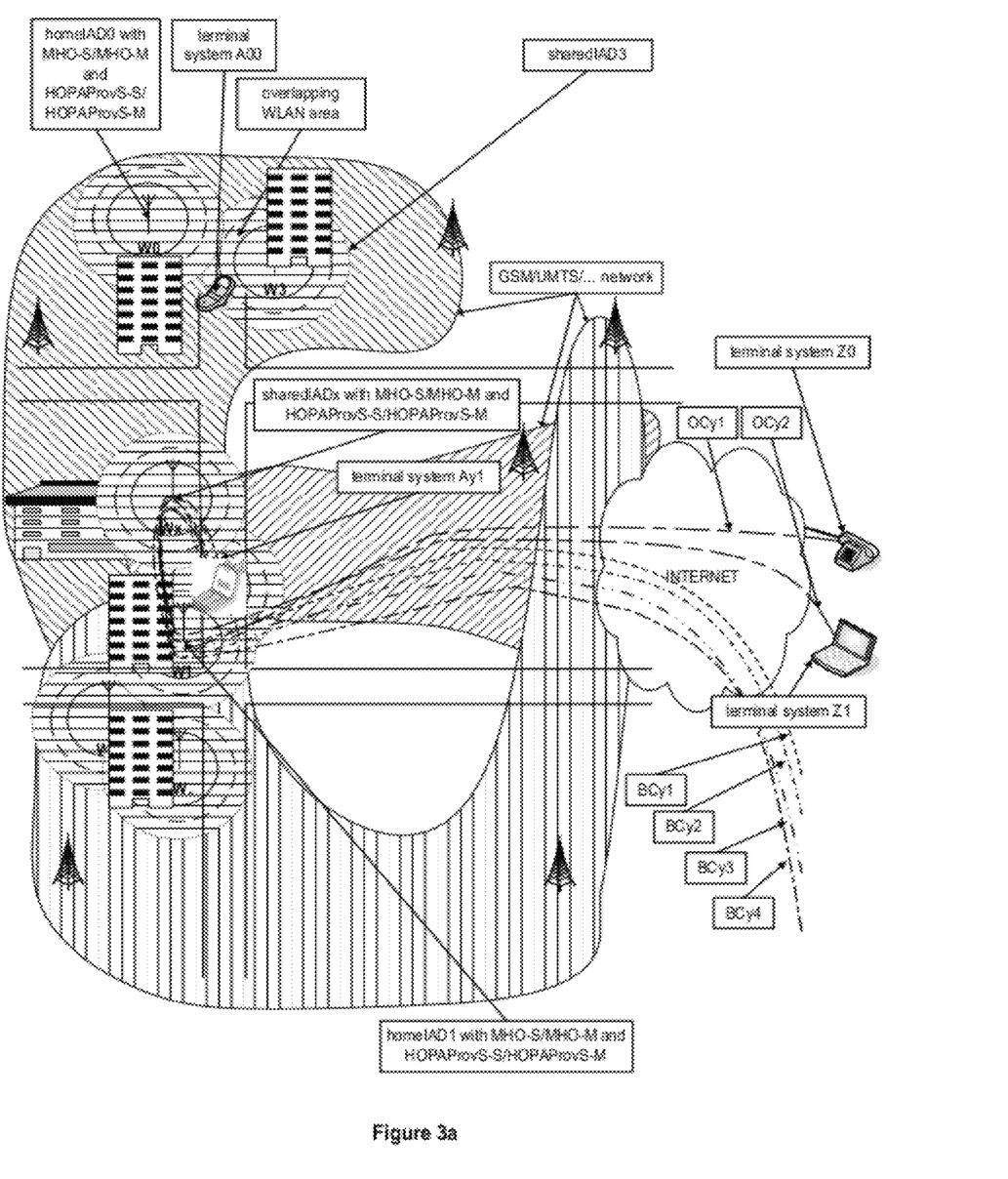
FIGS. 3a and 3b are block diagrams illustrating different particular handover situations for a subscriber, in 15 accordance with the present invention.
Figure 3B:
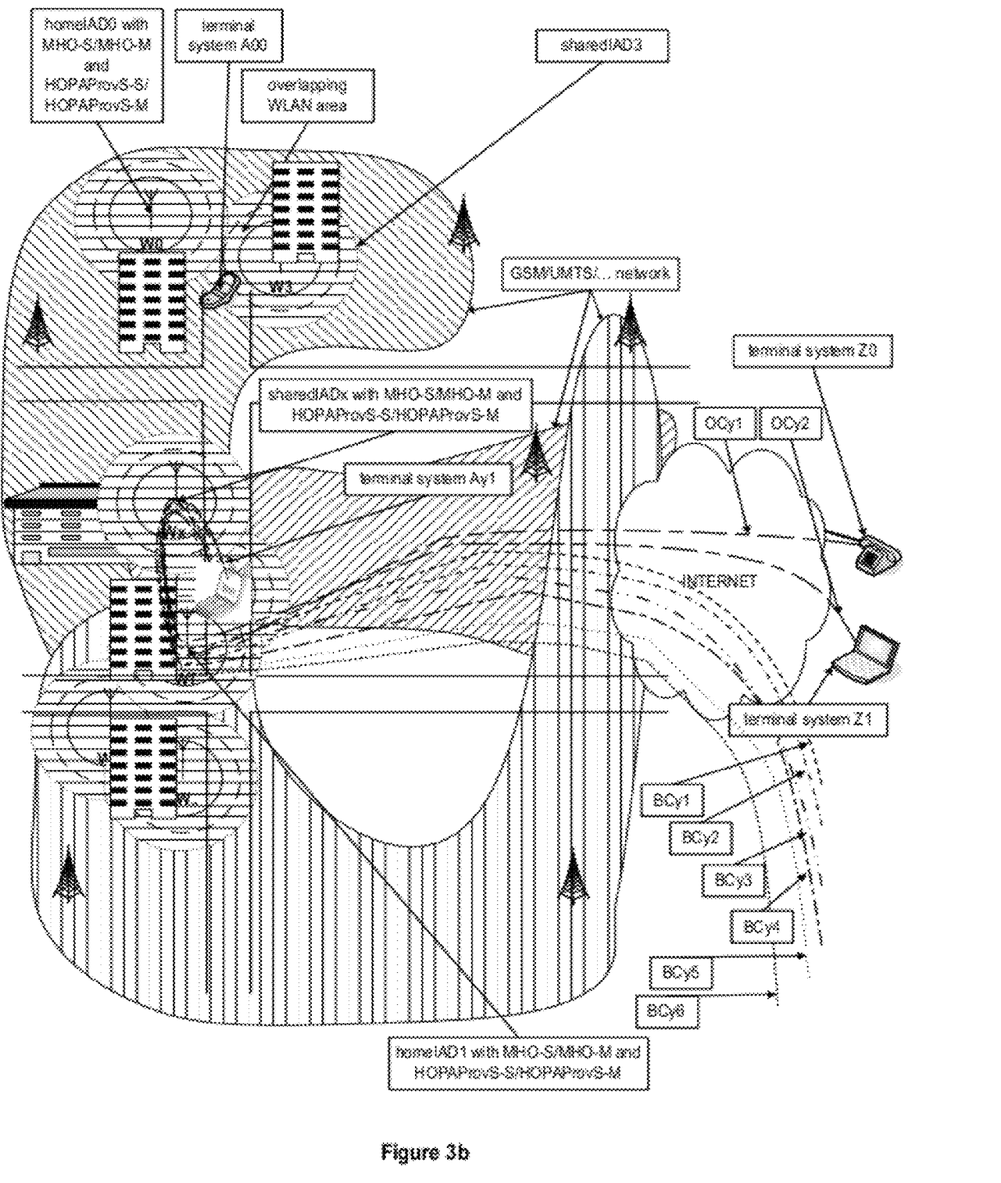

FIG. 3a shows for Ay1 its homeIAD1, its currently used sharedIADx, and its 2 OCy1, OCy2 and 4 BCy1-4. The HOPA-ClearS method/system may recognize pre-HO, which Sxyzjkmu-association proactively to establish resp. relay. FIG. 3b shows in addition that sharedIADx has the ability to also provide to Ay1 on his own BCy5 and BCy6, e.g. as demanded by Ay1's security and/or marketing and/or logistics and/or accounting and/or invoicing needs—being approved/supported by the HOPA-ClearS method/system. Enriching the FIG. 3 by an Ay2 kind of netsurfing systems is skipped here—but one single sharedIADx is able to route both kinds of Ay's at any point in time, i.e. is able to co-operate with several different HOPA clearing systems.

Figure 4:
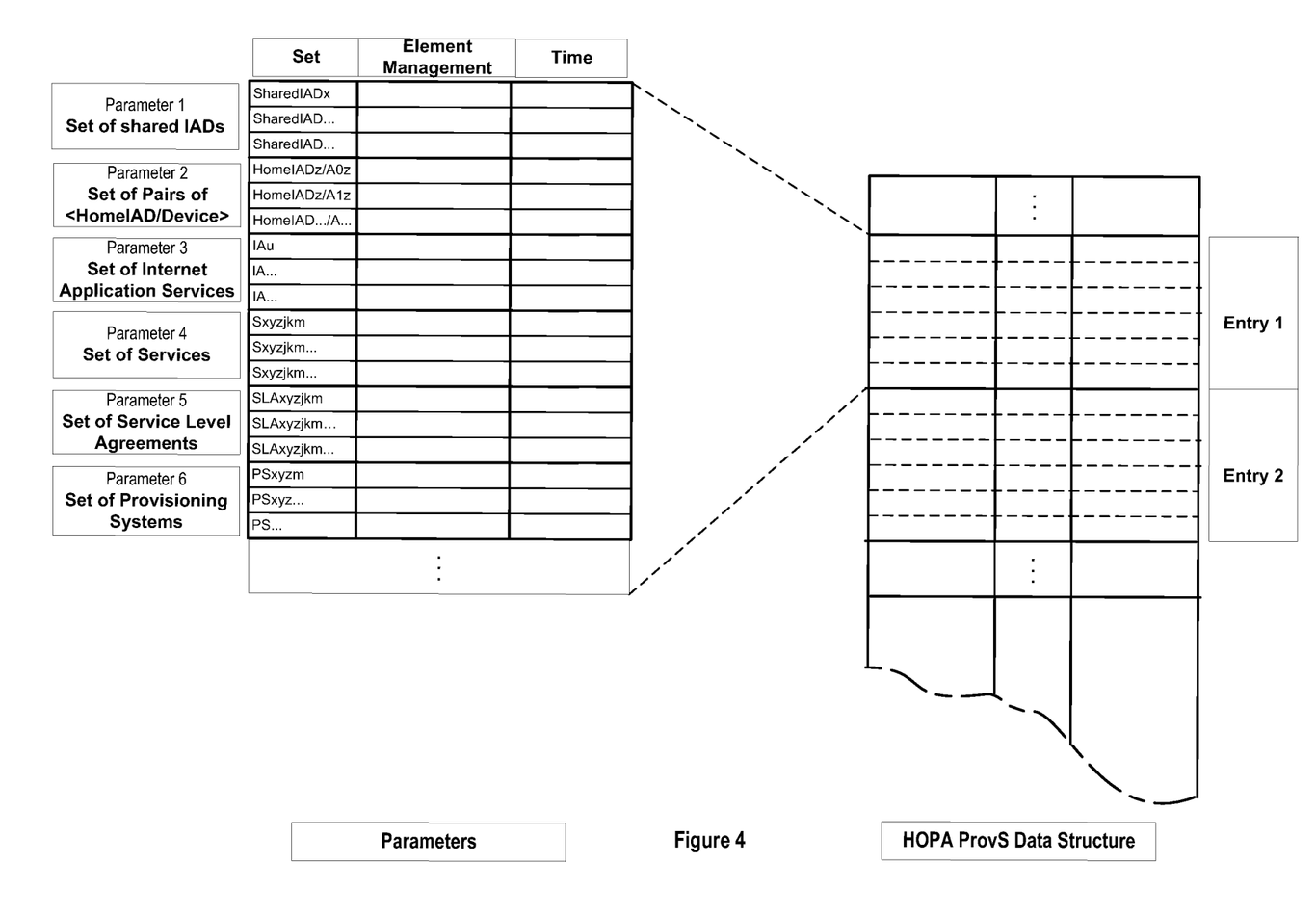
FIG. 4 is a diagram illustrating a handover proactive provisioning and support data structure, in accordance with the present invention.

FIG. 4 schematically shows a HOPA-ClearS data structure entry, as accessed from the side of the HOPA-ClearS modules on behalf of the managements of the homeIADz and their Ayz resp. of the sharedIADx and at least of one HOPA clearing system, as well as from the side of e.g. the HOPA-ClearsS modules on behalf of the managements of the homeIADz and their Ayz resp. of the sharedIADx and at least of one (above mentioned) HOPA clearing system.

The Figures should finally recall that phone calls, IP-TV, video clips, security assessment, medical surveillance, navigation guidance, . . . need different kinds of L3-services and L3-L7 resources in the endsystems.

The HOPA-ClearS method/system may also support identifying/negotiating—concurrently to its above pre-HO determination of all currently possible Sxyzjkm-associations—all competitions of the Ayz as to the sharedIADx services and potentially disclose to them totally or partially (enabled by e.g. agreements between competitors), which competitions exist on what sharedIADx for what Sxyzjkm. Such agreements and/or decisions on negotiations may take place market satisfaction function depending on use of services of Internet-apps, statically, e.g. upon buying or renting Ayz, globally or regionally or address dependent, with initial operation or anytime requested by its user, . . . and/or dynamically, e.g. dependent on the actual level of stress these devices are under (e.g. in a certain region), or on the degree of utilization of the Internet (e.g. in a region) or a Sxyzjkm, or . . . .

Some further hints as to the limitations of the HOPA-ClearS method/system seem appropriate:

There is no limitation as to the generation of and/or checking for and/or detection of a signal SIGxyz. In particular, it may be generated by a HOPA-ClearS system, as mentioned above.

Any Internet application service Sxyzjkm may be provided by a set of alternative and/or cooperating and/or concurrent or sequential communication applications and may involve several Internet endsystems.

A parameter may be constant or variable over time (predictable or not) and/or the same for several Ayz or sharedIADx or homeIADz and/or (in)dependent of another one, which holds in at least one geographic region and/or in at least one period of time.

There is no limitation as to additional pre-HO preparatory activities for an HO, e.g. communications with a HOPA-ClearS system mentioned above and/or additional given systems.

A HOPA-ClearS method/system may be capable of generating given alarms on the occurrence of certain events, such as on attempts to route data outside of the approved routings.

An auction of the HOPA-ClearS method/system may be fully automatic or interact with at least one user and/or may take place under its own control, or the control of the HOPA clearing system, or some separate system.

Finally it is clear to the person of pertinent skill that the communication architecture of the HOPA-ClearS method/system discussed above, with a HOPA-ClearS-S module in an endsystem's homeIAD, is independent of whether the latter includes in addition an MHO-S and/or a HOPA-ClearS-S module—i.e. that the HOPA-ClearS method/system may be used also to support "non-managed" and/or "non-cleared" HOs; and this holds for "vertical" just as for "horizontal" HOs (see the HOBIS patent), and any mixture of all HO types mentioned above.

the HOPA-ClearS method/system can be integrated in an arbitrary XYZ functionality, which differs from the former's precedingly disclosed functionality in any thinkable manner, i.e. not at all exhibit the usage of the HOPA-ClearS method/system in a separated way. Nevertheless it holds in that case: As soon as this XYZ functionality includes the above disclosed functionality of a HOPA-ClearS method/system, it interferes with the scope of patent protection for the HOPA-ClearS method/system—provided it will be granted.

what is said in the preceding paragraph as to the HOPA-ClearS method/system holds equally for any system of any of its parameters.

D. Terms and Notions of the HOPA-ClearS Method/Apparatus

The telecommunications technical terms used by this patent application and their meanings are defined by resp. based on—as far as they became existent only recently, i.e. didn't exist then—the international standard "ISO 7498-1, Information Technology—Open Systems Interconnection—Basic Reference Model: The basic model", called "ISO/OSI-Reference Model". For the person skilled in the art it is the absolutely mandatory basis also for the interpretation of, i.e. meanings allocation to, all communications technological terms, which have arisen only after the adoption of this OSI Reference Model by all relevant international and national consensus forming bodies, worldwide, such as ISO, IEEE, ITU, ANSI, ETSI, DIN, BSI, AFNOR, . . . . This holds also for the communications technology based terms introduced here for enabling describing the innovations of this patent application.

As to this "OSI-RM" there is, i.e. exists, an "OSI connection" for any interacting communications application, i.e. for every communication between the two endsystems (e.g. A0 and Z0) hosting the resp. interacting communications application system causing it. Thus, the "existence" of an OSI connection for the interacting communications application (system) starts with the very beginning of its first interaction.

This OSI connection then exists in particular between the two endsystems hosting the interacting communications application.

Here an OSI connection is often referred to by the acronyms OCj (=OSI connectionj) or BCj (="Business connectionj"), which are synonyms. The only reason for having the BCj is that it sometimes helps recalling that a communications application, Sj, may be a specific business application—then here also called "business communicationj", j=0, 1, 2, 3, . . . . Similarly, an OSI connection is often denoted as "communications connection".

The above said about OSI connections needs the following notional refinement. The OSI-RM defines the meaning of any "connection"—i.e. not only of a whole OSI connection, but also of any of its Li-connections (see below)—to be an "association" of its two endpoints. These endpoints are contained by an endsystem or a transitsystem. An example of an endsystem is a "netsurfing system, Ayz", and of a transitsystem is a "sharedIADx" being used by Ayz when roaming (for providing service Sj to its user). Thereby this sharedIADx is at the same time an endsystem of this roaming communications application system, partially contained by it. Each OSI connection comprises for each Layer.i, defined by the OSI-RM, at least one "Li-connection" alias "Li-association", $1 \leq i \leq 7$ (needing no clearing to their end-/transitsystems, see below). Thus, any Li-connection "exists" with its Li-association—as both terms have the same meaning—as soon as one of its endpoint systems knows about the second one, i.e. knows the address of the other endpoint system.

Thus an OSI connection exists between endsystems A and Z, as soon as in one of A or Z this association has become known for an interaction between their communications application, e.g. as soon as in A the address of Z and a communications application is available for this interaction. I.e.: The availability of a communications application for achieving this interaction requires to first "provision" this communications application at least to A. I.o.w., at the time of an OSI association/connection coming into existence, its at least one communications application is already provisioned at least to the system starting this application's first interaction.

In any Li-connection of an existing/existent OC or BC the transfer of data between its both endpoints and hence endsystems—i.e. of this interaction via any of this OC's/BC's Li-connections—may start for/with performing its "establishment" alias "set-up", which achieves any necessary "establishment"/"set-up" of the resources needed for this Li-connection in A and Z and/or agreement between both endpoints about what technical parameters would be used in it. All of an OC's/BC's Li-connections/associations must have been set-up/established (at least temporarily), before the transmission of "user data"—between the parts in A and Z of the communications application system the OC/BC is serving—may be completed.

There are associations/connections, which are provisioned a priori, i.e. right from starting the systems (or their subsystems) supposed to contain a resp. endpoint of them. And there are associations/connections, which are established as soon as they become existent (both enabled by a priori agreements about such associations/connections). This always holds in particular for all L3-associations (="Network connections") over the Internet, i.e. for any L3-association of two Internet endsystems A and Z as soon as A deals with the IP-address of Z (for an interaction between them). I.e.: Having provisioned an association/connection does not imply its establishment.

For the HOPA-ClearS method/apparatus let the terms "x/yz-association", "netsurfing-x/yz-association", and "Sxyzjkm-association" denote a conglomerate of Li-associations between the sharedIADx and the Ayz resp. the sharedIADx and the homeIADz resp. the sharedIADx or Ayz and at least one other endsystem hosting part of a communications application—in all three cases (to be) used for providing a service Sxyzjkm to Ayz.

A netsurfing-x/yz-association always connects the sharedIADx with the homeIADz and an Sxyzjkm-association may be relayed partially or completely over the homeIADz. The "clearing" of any one of both kinds of HOPA-ClearS associations denotes, as defined above already, making the resp. communications applications available to these associations' endsystems. It is (to be) performed pre-HO in a way outside of the scope of the HOPA-ClearS method/apparatus. HOPA-ClearS associations then come into existence as explained above, but would not yet be established in the general case.

The establishments of such existing HOPA-ClearS associations then also may be performed "basically pre-HO". I.e.: If the systems and network(s) executing an embodiment of the HOPA-ClearS clearing system are fast enough, it is possible to establish completely pre-HO
any netsurfing-x/yz-association (by having the sharedIADx and the Ayz run between them the resp. netsurfing protocol, see the above HOBIS patent), as well as
any Sxyzjkm-association (up to the sharedIADx) by having the sharedIADx and the other endsystem(s) involved run between them the resp. communications applications protocols implemented such as to enable the endsystems to support a multitude of such associations' endpoints, as known by the person of pertinent skill. He also knows that some communications application systems would not tolerate such complete pre-establishments of connections to them—due to reasons irrelevant here—which implies that in these cases this connection establishment completion must be deferred until the HO is completed. Hence the attribute "basically" used in this context.

A "hand-over, HO" occurs with(in) an existent OSI-connection, if a modification occurs with at least one of its Li-connections' functional or nonfunctional characteristics. Accordingly: An "Ayz performs an HO to the sharedIADx", or briefly "Ayz HOes to sharedIADx", if such a modification occurs with at least one Li-connection of at least one of Ayz' existent OSI-connections. Thereby frequently an L3-association is modified in its quality and/or replaced by another one and/or added/removed to/from an OSI-connection. Note: This notion of HO comprises also "service HOs" occurring to Ayz as soon as an Sxyzjkm provided to it and/or its user by a sharedIADx is modified, be it a modification e.g. of one of its L3-connections and/or one of its L7-connections. This such modification may also occur only within the Ayz and/or may be supported by Ayz's communications with at least one given other system and/or network than that/those of the sharedIADx.

HO-Time

The invention claimed is:
1. A method for proactively establishing associations of a netsurfing end-system having a home Integrated Access Device (IAD) to at least one shared IAD and/or at least one application service, prior to a handover of said netsurfing end-system between IADs or between application services, comprising:
checking for a signal indicating that the netsurfing system may perform a handover within a given time t1>0 to either a shared IAD and/or to a network application service different from an IAD or application currently being used by the netsurfing end-system;

in response to receiving said signal, and prior to any handover operation, establishing an association of at least one shared IAD and/or network application service with said netsurfing end-system via said home IAD;

whereby a time required to complete handovers of said netsurfing end-system between shared IADs or network application services is reduced relative to a time required to complete such handovers without such pre-handover associations.

2. The method of claim 1, further comprising initiating an auction or tariff negotiation activity with a user of a netsurfing system or the management of related home network access devices concerning services provided by a shared IAD to which a netsurfing end-system may be handed over.

3. The method of claim 2, wherein services provided by a shared IAD to which a netsurfing system may be handed over include marketing activity for a network application service or for a product or service not provided by that shared IAD.

4. The method of claim 1, wherein said shared IAD is a mobile or netsurfing system.

5. The method of claim 1, wherein the establishing of an association is performed in conjunction with a communication about at least one post-handover service quality.

6. The method of claim 1, wherein said signal is generated in dependence upon the location of the netsurfing end-system with respect to a shared IAD.

7. The method of claim 1, wherein establishing an association comprises identifying a shared IAD and/or network application service with which to establish said association by optimizing parameters of a predefined market satisfaction function.

8. The method of claim 7, wherein parameters of said predefined market satisfaction function include parameters specifying conditions of at least one of netsurfing end-system network access, netsurfing end-system priority level, cost of network service, and shared IAD capacity.

9. The method of claim 1, further comprising storing said associations in a data structure of a module associated with management of said home IAD and its corresponding netsurfing end-systems.

10. The method of claim 9, wherein said data structure comprises entries identifying at least shared IADs, pairings of home IADs/netsurfing end-systems, and network application services.

* * * * *